Patented Jan. 4, 1949

2,458,484

UNITED STATES PATENT OFFICE 2,458,484

PROCESS OF PREPARING EPOXY DERIVATIVES FROM UNSATURATED ALIPHATIC COMPOUNDS

David E. Terry and Donald H. Wheeler, Minneapolis, Minn., assignors to General Mills, Inc., a corporation of Delaware No Drawing. Application June 17, 1946, Serial No. 677,400

7 Claims. (Cl. 260—348)

The present invention relates to an improved process of preparing epoxy compounds in good yields from unsaturated aliphatic compounds. These epoxy compounds are valuable as plasticizers, solvents, and intermediates for the production of other derivatives by reaction of the ethylene oxide structure produced. Such reaction includes reaction of ammonia or amines to form ethanol amines, with alcohols to form glycol ethers, with esterifying agents to form glycol esters, and other reactions characteristic of the ethylene oxide structure.

Previously the formation of epoxy derivatives from unsaturated compounds such as unsaturated fatty acids and their derivatives, has involved the use of perbenzoic acid. This compound, however, has been inherently a very expensive reagent and the separation of the resulting benzoic acid from the reaction product is often difficult. More recently, Findley et al. (J. A. C. S. 67, 412, 1945) have shown that it is possible to use a solution of peracetic acid in glacial acetic acid under anhydrous conditions to epoxidize unsaturated fatty materials. This procedure involved the formation of a solution of peracetic acid in glacial acetic acid by the action of 30% hydrogen peroxide and acetic anhydride at 40° C. either in the absence of a catalyst or with a sulfuric acid catalyst. The resultant anhydrous peracetic acid solution was found to dissolve unsaturated fatty materials and accordingly a homogeneous reaction mixture resulted and permitted the reaction to proceed without undue difficulty.

The Findley et al. procedure was satisfactory for laboratory preparations but left much to be desired as respects commercial production. Thus the acetic anhydride employed in the process is recovered only as a dilute acetic acid solution, since it is necessary to dilute the reaction mixture with water in order to recover the epoxy compounds. This dilute acetic acid is much less valuable than the acetic anhydride used as the starting material and could be converted to the anhydride only at considerable expense. Moreover, the reaction between hydrogen peroxide and acetic anhydride in the preparation of the peracetic acid is extremely exothermic and sometimes almost explosive.

We have found that it is possible to prepare epoxy derivatives of fatty compounds by means of solutions of peracetic acid in aqueous acetic acid, and that the reaction may be made to proceed to high yields without undue difficulty. It is thus possible to prepare peracetic acid from 30% or higher concentrations of hydrogen peroxide with glacial acetic acid. Thus the acetic acid constituent is employed in the form of the less expensive glacial acetic acid as compared with the anhydride. Moreover, it is possible to recover the acetic acid from the dilute reaction mixture in the form of glacial acetic acid by any of a number of simple processes such as azeotropic distillation, solvent extraction and the like, which do not require the more expensive equipment necessary for the production of the anhydride.

Moreover, it is found that the conversion of hydrogen peroxide and acetic acid into peracetic acid by this means, results in at least as high yield, and sometimes higher yields than are obtainable by the method of Findley et al. Moreover, there was no formation of acetyl peroxide which might accumulate to explosive concentrations in subsequent recovery of the by-products.

The reaction has been found to go to high yields by employing vigorous agitation with the aqueous peracetic acid, and since agitation is necessary anyway for accurate control of the reaction temperature, this does not involve any undue disadvantage.

It is, therefore, an object of the invention to provide a novel process for the epoxidation of compounds containing an unsaturated long chain aliphatic group.

It is another object of the invention to provide a novel process of effecting epoxidation of organic compounds containing an unsaturated long chain aliphatic group, involving the use of aqueous peracetic acid.

These and other objects of the invention will be more fully apparent from the following description thereof, with particular reference to specific examples which are to be considered as illustrative only.

The invention is applicable to acids, esters, and amides containing an unsaturated long chain aliphatic group. It is particularly applicable to esters and amides of higher unsaturated fatty acids, and to the free acids, but is also applicable to esters of higher unsaturated fatty alcohols.

The fatty acid group may be derived from any animal, vegetable or marine oil containing unsaturated fatty acid groups. The fatty acid group may be the mixed fatty acids contained in such oils, or it may be the fatty acid group of an isolated unsaturated acid. Where the unsaturated long chain aliphatic group is in the acid part of the ester, almost any alcohol may be used for esterification, such as monohydric aliphatic alcohols (methyl, ethyl, propyl, butyl, etc.), polyhydric alcohols (glycols, glycerols, polyglycerols), and in general, almost any alcohol group.

The invention is applicable to amides, whether unsubstituted mono- or di-substituted. Where substituted amides are employed, the low aliphatic substituted amides are preferred.

Where the unsaturated long chain aliphatic group is in the alcohol portion of the molecule, the acid used for esterification may be almost any acid, and is preferably a low fatty acid such as acetic, propionic, butyric, etc.

In general, the improved process is carried out as follows: Glacial acetic acid or acetic acid of high concentration is reacted with aqueous hydrogen peroxide solution (30–90%) with a sulfuric acid catalyst (1.5%) until equilibrium is attained (2 hours at 40° C. to 12 hours at 25° C.). The reaction is only very slightly exothermic, if at all. After the reaction is complete, sodium hydroxide or other base is added in an amount equivalent to, or slightly in excess of, that required to neutralize the sulfuric acid catalyst. To the solution of peracetic acid there is then added the unsaturated aliphatic compound and the reaction mixture is stirred so that a fine emulsion is formed. This reaction is slightly exothermic and the temperature is regulated within suitable limits, from room temperature to 45° C. or higher, and maintained at this temperature for a suitable time, such as 4 hours at 25° C., 2 hours at 35° C., or 1 hour at 45° C. Temperatures of 45° C. or below are preferred as the epoxy oxygen content introduced in an optimum time period is somewhat greater at the lower temperature. At the end of the reaction time more water may be added in sufficient amount to aid in the separation of the epoxidized product which separates as an oil or solid, and is recovered by usual methods, washed with water, and dried. The addition of water to aid in separation of the phases is not essential as two phases will result even in the absence of added water. However, the use of additional water effects a sharper separation and makes possible higher recoveries of the epoxy product.

The dilute acetic acid layer may be recovered and the water removed by azeotropic distillation or other known methods to produce glacial acetic acid of high concentration acetic acid for re-use.

The following examples will serve to illustrate the invention:

PREPARATION OF PERACETIC ACID SOLUTION

Example 1

100 parts glacial acetic acid, 25 parts 30% $H_2O_2$, and 1.5% $H_2SO_4$ were combined and allowed to stand 16 hours (overnight) at 20–25° C. Yield based on original $H_2O_2$ was: peracetic acid, 73.7%, unreacted $H_2O_2$, 20.5%, and negligible acetyl peroxide.

Example 2

300 parts glacial acetic acid, 25 parts 90% $H_2O_2$ solution, and 1.5% $H_2SO_4$ were combined and allowed to stand 16 hours (overnight) at 20–25° C. Yield based on original $H_2O_2$ was peracetic acid, 85%, and unreacted $H_2O_2$, 5.9%. The acetyl peroxide was negligible.

PREPARATION OF EPOXIDIZED COMPOUNDS

Example 3

Methyl epoxystearate 200 parts peracetic acid solution (prepared from glacial acetic acid and 30% $H_2O_2$) containing 0.255 mole of peracetic acid was treated with 12.5 parts sodium acetate trihydrate to remove $H_2SO_4$. 62.5 parts technical methyl oleate (0.212 mole), iodine value =85.5, was added and the reaction mixture was vigorously agitated for 2 hours at 35° C. The reaction mixture was poured into water equal in weight to the glacial acetic acid in the peracetic reagent. The product quantitatively separated from the 50% acetic acid solution and was then washed free of acidity and dried. The product contained 4.0% epoxy oxygen and had an iodine value of 8.3.

Example 4

Epoxidized soybean oil 292 parts peracetic acid solution (prepared from glacial acetic acid and 30% $H_2O_2$) containing 0.338 mole of peracetic acid, was treated with 18.3 parts of sodium acetate trihydrate to remove $H_2SO_4$. 50 parts soybean oil, iodine value =143, was added and the reaction was vigorously agitated for 3½ hours at 35° C. The product was isolated by pouring the reaction mixture into water as described previously. The product had an iodine value of 9.6 and contained 5.85% epoxy oxygen.

Example 5

Diethylene glycol diepoxystearate 600 parts peracetic acid solution (prepared from glacial acetic acid and 30% $H_2O_2$) containing 0.65 mole peracetic acid was treated with 37.5 parts sodium acetate trihydrate to remove the $H_2SO_4$. 174 parts of diethylene glycol dioleate, iodine value =80, was added and the reaction was vigorously stirred at 35° C. for 2 hours. The reaction mixture was poured into water as described previously. The isolated product had an iodine value of 19.7 and contained 3.5% epoxy oxygen. Yield=175 parts of product.

300 parts peracetic acid solution (prepared from glacial acetic acid and 90% $H_2O_2$) containing 0.45 mole peracetic acid was treated with 20.5 parts sodium acetate trihydrate to remove the $H_2SO_4$. 132 parts of diethylene glycol dioleate, iodine value =80, was added and the reaction was vigorously stirred at 35° C. for two hours. The reaction mixture was poured into water as described previously. The isolated product had an iodine value of 4.1 and contained 4.25% epoxy oxygen. Yield=133 parts.

Example 6

Epoxidized N-amyl "monomer" amide 112 parts peracetic acid solution (prepared from glacial acetic acid and 30% $H_2O_2$) containing 0.1 mole of peracetic acid was treated with 7 parts sodium acetate trihydrate to remove the $H_2SO_4$. 25 parts N-amyl monomer amide was added and the reaction was vigorously stirred for 2 hours at 35° C. ("Monomer" is used to designate the unpolymerized esters obtained from soybean oil methyl esters which have been polymerized by heat. The monomer is distilled in vacuo from the "dimer" which is non-volatile. Monomer is thus a mixture of methyl esters of oleic, linoleic, and saturated acids, and is composed principally of oleic.) The product was isolated as previously described. The product had an iodine value of 8.6 and contained 2.9% epoxy oxygen. Yield= 20 parts.

EXAMPLE 7

Epoxidized monomer 3050 parts peracetic acid solution (prepared from glacial acetic acid and 30% $H_2O_2$) containing 3.88 moles of peracetic acid was treated with 56 parts solid NaOH to neutralize the $H_2SO_4$. 1000 parts of "monomer," iodine value=82, was added, and the reaction was vigorously stirred for 2 hours at 35° C. Enough water, 2000 parts, was added to reduce the acetic acid/water ratio to 1:1. The product was separated and washed as before. The product had an iodine value of 11.8 and contained 3.2% epoxy oxygen. Yield=986 parts of product.

EXAMPLE 8

Epoxystearyl acetate 170 parts peracetic acid solution (prepared from glacial acetic acid and 30% $H_2O_2$) containing 0.30 moles of peracetic acid was treated with 10.6 parts sodium acetate trihydrate to remove $H_2SO_4$. 50 parts oleyl acetate, iodine value=63, was added, and the reaction was vigorously stirred at 35° C. for 2 hours. The product was isolated by pouring the reaction mixture into water as described before. The product had an iodine value of 5.3 and an epoxy oxygen content of 2.2%. Yield=49.5 parts of product.

EXAMPLE 9

Epoxidized butyl carbitol esters of monomer 117 parts peracetic acid solution (prepared from glacial acetic acid and 30% $H_2O_2$) containing 0.135 mole of peracetic acid was treated with 7.3 parts of sodium acetate trihydrate to remove $H_2SO_4$. 50 parts of butyl carbitol esters of monomer, iodine value=65.5, were added; and the reaction mixture was vigorously stirred at 35° C. for 2 hours. The product was isolated as in previous example. It had an iodine value of 6.0 and contained 2.0% epoxy oxygen.

EXAMPLE 10

Epoxystearyl epoxystearate 207 parts of peracetic acid solution (prepared from glacial acetic acid and 30% $H_2O_2$) containing 0.226 mole of peracetic acid was treated with 13.0 parts sodium acetate trihydrate to remove $H_2SO_4$. 50 parts oleyl oleate, iodine value=85, was added, and the reaction mixture was vigorously stirred at 35° C. for 2 hours. The product was isolated as previously described. It had an iodine value of 28.5 and contained 3.2% epoxy oxygen.

EXAMPLE 11

Epoxidized soybean oil methyl esters 253 parts peracetic acid solution (prepared from 30% $H_2O_2$ and glacial acetic) containing 0.315 mole peracetic acid was treated with 15.8 parts of sodium acetate trihydrate to remove $H_2SO_4$. 50 parts soybean oil methyl esters, iodine value=133.1, were added and the reaction was held with vigorous agitation at 35° C. for 2 hours. The reaction mixture was poured into water and the product was washed and dried. Iodine value =9.8; epoxy oxygen content=5.73%.

EXAMPLE 12

Epoxidized N,N,di-n-butyl monomer amide 310 parts peracetic acid solution (prepared from 30% $H_2O_2$ and glacial acetic) containing 0.358 mole peracetic acid was treated with 20 parts sodium acetate trihydrate to remove $H_2SO_4$. 100 parts N,N, di-n-butyl monomer amide, iodine value=75.6, was added and the reaction was held with vigorous agitation at 35° C. for 3 hours. Yield=100 parts; iodine value=7.4; epoxy oxygen content=2.58%.

EXAMPLE 13

Epoxidized oleic acid 170 parts peracetic acid solution (prepared from 30% $H_2O_2$ and glacial acetic) containing 0.200 mole peracetic acid was treated with 3.2 parts 97% NaOH to remove $H_2SO_4$. 46 parts 90% oleic acid, iodine value=90, was added and the reaction was held with vigorous agitation at 35° C. for 2 hours. The reaction mixture was dumped into an equal volume of water; and the epoxystearic acid was extracted with ether, washed free of acetic and peracetic acids, and dried. The solvent-free epoxystearic acid had an iodine value =7.0 and contained 4.2% epoxy oxygen.

EXAMPLE 14

Epoxidized dimer 128 parts of peracetic acid solution (made from 30% $H_2O_2$ and glacial acetic) containing 0.14 mole peracetic acid was freed of $H_2SO_4$ with sodium acetate trihydrate. 35 parts dimer (iodine value =85) was added and the reaction was held at 35° C. with vigorous agitation for 3 hours. The product was poured into water, taken up in ether, and washed free of acidity. The solvent-free product had an iodine value =19.2 and contained 2.25% epoxy oxygen.

The method of epoxidation described can be applied to a wide variety of compounds as shown in the above examples. These compounds fall into the class of esters, acids, and amides which contain a long chain unsaturated aliphatic group, and in general, compounds within this class are applicable to the present invention.

The variations of time, temperature, and reactant ratios permissible or desirable in the preparation of aqueous acetic acid solution of peracetic acid, will depend on the time available for the reaction and the relative costs of the reagents in regard to yields. The following data illustrates the effects of such variations on the yield of peracetic acid:

1. 100 parts glacial acetic acid, 25 parts of 30% $H_2O_2$ with 1.5% $H_2SO_4$ at 40° C. for 2 hours gave 70% yield of peracetic acid.
2. 50 parts glacial acetic acid, 25 parts of 30% $H_2O_2$ with 1.5% $H_2SO_4$ at 40° C. for 2 hours gave 55% yield of peracetic acid.
3. 100 parts glacial acetic acid, 25 parts of 30% $H_2O_2$ with 1.5% $H_2SO_4$ at 25° C. for 16 hours gave a 77% yield of peracetic acid.
4. 100 parts of glacial acetic acid, 8.33 parts of 90% $H_2O_2$ with 1.5% $H_2SO_4$ at 25° C. for 16 hours gave 85% yield of peracetic acid.

Stability tests of peracetic acid at elevated temperatures show that the peracetic acid solution becomes increasingly unstable as the temperatures increase, and in general indicates that, except in unusual circumstances, it is desirable to prepare and use the reagent at temperatures not much above 40° C.

A solution of peracetic acid was made from 100 parts of glacial acetic acid, 25 parts of 30% $H_2O_2$ with 1.5% $H_2SO_4$ for 16 hours at 25° C. Yield of peracetic acid was 78.4%. This solution was kept at various temperatures for 15 minutes and then tested for per cent decrease in peracetic acid:

| Temperature | Percent Decrease |
|---|---|
| 40 | 4.7 |
| 60 | 10.7 |
| 80 | 13.7 |
| 107 | 15.8 |

Although the use of a higher temperature permits more rapid attainment of equilibrium, the use of a lower temperature gives somewhat higher yields of peracetic acid. The balance between yield and saving of time would depend upon conditions of material costs and economy of use of apparatus. Similarly, the ratio of glacial acetic acid to $H_2O_2$, and the concentration of $H_2O_2$ affects yields. The higher the ratio of glacial acetic acid to $H_2O_2$, and the higher the concentration of $H_2O_2$, the greater is the yield of peracetic acid. The balance between the increased yield and the increased cost of acetic acid or concentrated $H_2O_2$ will depend on the existing costs of these reactants.

For the epoxidation reaction, the variables of time, temperature and ratio of reagents permissible or desirable for the epoxidation reaction will depend upon the time available for reaction, the degree of conversion to epoxy derivatives, and the material costs of the reactants. Generally, the maximum degree of epoxidation is desirable in order to obtain to the greatest degree the desirable properties which the epoxy grouping confers to the epoxidized product in comparison with the original material. The following examples illustrate the effect of varying time, temperature and reactant ratios upon the yield of epoxy group introduced into typical unsaturated aliphatic compounds.

A. TIME AND TEMPERATURE EFFECTS

1. Methyl oleate (iodine value, 85.6) with 20% excess of peracetic acid solution from 30% $H_2O_2$ and glacial acetic acid.

| Temp., ° C. | Time, Hrs. | Iodine Value | Percent Epoxy Oxygen |
|---|---|---|---|
| 45 | 0.5 | 12.3 | 3.80 |
| 45 | 1 | 6.8 | 3.90 |
| 45 | 2 | 5.8 | 3.64 |
| 35 | 0.5 | 35.7 | 2.73 |
| 35 | 1 | 18.9 | 3.46 |
| 35 | 2 | 8.3 | 3.97 |
| 35 | 4 | 5.4 | 3.90 |
| 25 | 2 | 25.7 | 3.25 |
| 25 | 4 | 8.3 | 4.00 |

2. Soybean oil (iodine value, 143) same as above, at 35° C.

| Time, Hrs. | Iodine Value | Percent Epoxy Oxygen |
|---|---|---|
| 0.5 | 88.4 | 2.89 |
| 1 | 59.0 | 4.32 |
| 2 | 30.1 | 5.39 |
| 3.5 | 9.6 | 5.85 |

From the above, it will be seen that the maximum epoxy oxygen is reached in 1 hour at 45° C., 2 to 4 hours at 35° C., and about 4 hours at 25° C.

B. EXCESS OF PERACETIC REAGENT

Conditions the same as A–1 above except no excess of peracetic acid reagent over theory. Temperature, 35° C.

| Time, Hrs. | Iodine Value | Percent Epoxy Oxygen |
|---|---|---|
| 0.5 | 38.0 | 2.68 |
| 1 | 22.7 | 3.34 |
| 2 | 12.4 | 3.84 |
| 3.5 | 3.4 | 3.86 |

This data shows that the results with no excess of peracetic acid are almost identical with those employing a 20% excess.

From the above description of the invention, it will be apparent that the present invention has provided a novel and economical process of producing epoxy derivatives of various organic compounds.

While various modifications of the invention have been described, it is to be understood that the invention is not limited thereto, but may be varied within the scope of the following claims.

We claim as our invention:

1. Process for the epoxidation of water immiscible organic compounds selected from the group consisting of acids, esters and amides, said compounds containing a long chain unsaturated aliphatic group, which comprises reacting said organic compound with aqueous peracetic acid immiscible with said organic compound under conditions of vigorous agitation, allowing the reaction mixture to separate into two phases, and separating the two phases.

2. Process for the epoxidation of water immiscible organic compounds selected from the group consisting of acids, esters and amides, said compounds containing a long chain unsaturated aliphatic group, which comprises reacting said organic compound with aqueous peracetic acid immiscible with said organic compound under conditions of vigorous agitation, adding water to aid in separation of the reaction mixture into two phases, and separating the two phases.

3. Process for the epoxidation of water immiscible organic compounds selected from the group consisting of acids, esters, and amides, said compounds containing a long chain unsaturated fatty acid group, which comprises reacting said organic compound with aqueous peracetic acid immiscible with said organic compound under conditions of vigorous agitation, adding water to aid in separation of the reaction mixture into two phases, and separating the two phases.

4. Process for the epoxidation of a water immiscible ester of an unsaturated higher fatty alcohol, which comprises reacting said ester with aqueous peracetic acid immiscible with said ester under conditions of vigorous agitation, adding water to aid in separation of the reaction mixture into two phases, and separating the two phases.

5. Process for the epoxidation of water immiscible organic compounds selected from the group consisting of acids, esters and amides, said compounds containing a long chain unsaturated aliphatic group, which comprises reacting said organic compound with aqueous peracetic acid immiscible with said organic compound under the conditions of vigorous agitation and at a temperature not substantially in excess of 45° C., adding water to aid in the separation of the reaction mixture into two phases, and separating the two phases.

6. Process for the epoxidation of water immiscible organic compounds selected from the group consisting of acids, esters and amides, said compounds containing a long chain unsaturated aliphatic group, which comprises preparing aqueous peracetic acid immiscible with said organic compound, reacting said organic compound with the aqueous peracetic acid under conditions of vigorous agitation, adding water to aid in the separation of the reaction mixture into two phases, separating the two phases, removing water from the aqueous acetic acid phase and using the remaining acetic acid phase for the preparation of aqueous peracetic acid for further epoxidation.

7. Process for the epoxidation of water immiscible organic compounds selected from the group consisting of acids, esters and amides, said compounds containing a long chain unsaturated aliphatic group, which comprises reacting acetic acid in a concentration not higher than glacial acetic acid with aqueous hydrogen peroxide in the presence of an acid catalyst to prepare aqueous peracetic acid immiscible with said organic compound, neutralizing the acid catalyst, reacting the aqueous peracetic acid with said organic compound under conditions of vigorous agitation, adding water to aid in the separation of the reaction mixture into two phases, separating the two phases, removing the water from the aqueous acetic acid phase by azeotropic distillation to produce a concentrated acetic acid fraction, and using the concentrated acetic acid fraction for the preparation of aqueous peracetic acid for further epoxidation.

DAVID E. TERRY.
DONALD H. WHEELER.

REFERENCES CITED

The following references are of record in the file of this patent:

UNITED STATES PATENTS

| Number | Name | Date |
|---|---|---|
| 2,411,762 | Swern | Nov. 26, 1946 |

OTHER REFERENCES

Findley et al., Journal of the American Chemical Society, vol. 67, March 1945, page 412–414.

Gilman, Organic Chemistry an Advanced Treatise, Second Edition, John Wiley & Sons, 1943, page 634.